US007983791B2

(12) United States Patent
Fairweather

(10) Patent No.: US 7,983,791 B2
(45) Date of Patent: Jul. 19, 2011

(54) DYNAMIC SELECTION OF FOLD-ADDRESS TO MATCH DOCUMENT LAYOUT

(75) Inventor: James A. Fairweather, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 851 days.

(21) Appl. No.: 11/862,564

(22) Filed: Sep. 27, 2007

(65) Prior Publication Data

US 2009/0088893 A1 Apr. 2, 2009

(51) Int. Cl.
*G06F 7/00* (2006.01)
*B41F 13/54* (2006.01)

(52) U.S. Cl. ........ 700/221; 700/220; 700/223; 700/227; 700/224; 270/1.02; 270/1.03

(58) Field of Classification Search ........................ None
See application file for complete search history.

(56) References Cited

U.S. PATENT DOCUMENTS

| | | | | |
|---|---|---|---|---|
| 5,264,665 | A | 11/1993 | Delfer | |
| 5,650,934 | A * | 7/1997 | Manduley | 700/215 |
| 5,745,590 | A * | 4/1998 | Pollard | 382/101 |
| 6,697,843 | B1 * | 2/2004 | Carlin et al. | 709/206 |
| 6,725,126 | B1 | 4/2004 | Doery | |
| 2008/0082205 | A1 * | 4/2008 | Park et al. | 700/223 |

FOREIGN PATENT DOCUMENTS

| | | | |
|---|---|---|---|
| EP | 0893788 | A2 | 1/1999 |
| EP | 1625947 | A | 2/2006 |
| EP | 1625947 | A2 * | 2/2006 |

* cited by examiner

*Primary Examiner* — Gene Crawford
*Assistant Examiner* — Yolanda Cumbess
(74) *Attorney, Agent, or Firm* — Steven J. Shapiro; Charles R. Malandra, Jr.

(57) ABSTRACT

A method for coding the address location on a document or in a data base so that two or more electronic mailings with differing address placements may be combined together and sorted while the mailings are still in electronic form in order to take advantage of workshare discounts, delivery sequence efficiency, desired delivery date, class of delivery service, etc.

2 Claims, 18 Drawing Sheets

DYNAMIC SELECTION OF FOLD-ADDRESS TO MATCH DOCUMENT LAYOUT

FIELD OF THE INVENTION

This invention relates to mailing mail pieces and, more specifically, to mailing and sorting mail pieces to increase postal discounts.

BACKGROUND OF THE INVENTION

Most companies throughout the United States use the services of the United States Postal Service (USPS) to communicate with their customers. These companies use the USPS to deliver monthly bills, monthly statements, annual reports for shareholders, catalogs for holiday shopping, newspapers, monthly magazine subscriptions, and Standard Mail (A) direct mail.

The cost associated with moving mail from the sender to the recipient is related primarily to the manual effort involved. The mail must go through several sorting processes and eventually be sorted down to the carrier delivering the mail.

The USPS has issued approximately 42,000 five digit zip code in order to improve the automatic sortation and delivery of mail. If mail pieces are pre-sorted by large mailers it becomes easier for the USPS to process the mail.

The USPS has spent billions of dollars to automate this process. The intent of automation is to process the mail faster while minimizing costs. To minimize costs, automated equipment has been manufactured and data processing methods have been implemented. The data processing methods were created so that the mailers themselves could perform certain tasks that would make it easier for the USPS to process the mail. The USPS passes the labor savings on to any mailer who shares in the work in the form of postage discounts. This is known as "work sharing." There are a number of tasks that a mailer can perform to obtain work sharing discounts. The more work the mailer performs, the greater the discounts.

The USPS offers work share discounts for mailings that meet certain address, barcode and sortation standards so as to allow the mailing to bypass certain processing steps and expedite the mailing process. These special discounts are called 'workshare' discounts. Mailings that meet 'workshare' standards qualify for discount 'automation' rates (5-digit/scheme, 3-digit/scheme, AADC (Automated Area Distribution Centers), Mixed AADC). For example, to qualify for the 5-digit/scheme rate, a tray with a minimum of 150 pieces must be destined to the same 5-digit zip code (e.g., 06512. To qualify for the 3-digit/scheme rate, a tray with a minimum of 150 pieces must be destined to the same 3-digit zip code 068XX (Stamford, Conn.), 120XX (Albany, N.Y.), 191XX (Philadelphia, Pa.), 465XX (South Bend, Ind.) and to qualify for the AADC rate a tray with a minimum of 150 pieces must be destined to the same AADC. To qualify for mixed AADC all remaining pieces placed in trays are required to be mixed AADC.

The following rates and fees apply to one-ounce First Class automation letters:

| | |
|---|---|
| 5-digit/scheme | $0.293 |
| 3-digit/scheme | $0.308 |
| AADC | $0.317 |
| Mixed AADC | $0.326 |

The workshare process is utilized by individual large mailers and/or by mailers inconjunction with postal presort operations that combines mailers mailings to obtain postal workshare discounts. When the mailings of individual mailers are combined and/or mailings of multiple mailers are combined by a postal presort operation to achieve workshare discounts, the individual mail pieces are physically sorted to sequence, interleaving mail pieces from the combined mailings.

A disadvantage of the prior art is that a large portion of the workshare processes is performed after the mail pieces are created.

A further disadvantage of the prior art is that the fold address combination of the document must fit in the same physical envelope for all mail pieces in the mail run.

SUMMARY OF THE INVENTION

This invention overcomes the disadvantages of the prior art by coding the address location on a document or in a data base so that two or more electronic mailings with differing address placements. i.e., multiple formats may be combined together and sorted while the mailings are still in electronic form in order to take advantage of workshare discounts, delivery sequence efficiency, desired delivery date, class of delivery service, etc. The foregoing allows documents with addresses in the top middle or bottom address panel to be electronically sorted for workshare discounts prior to physical creation of the document and its insertion into the envelope. It is clear that electronic sortation of envelopes is more accurate than the physical soration of envelopes and can be performed with higher reliability. The electronically sorted documents may have any sequence of address placements and the sequence is only governed by the work share discount rules, delivery sequence efficiency, desired delivery date, class of delivery service and/or other desired sort rules.

In this patent the term address refers to the mailing address of a recipient and the term location refers to the location of the address placement on the document.

An advantage of this invention is that multiple address formats may be used within the same mail run.

An additional advantage of this invention is that the same windowed envelope may be used for a variety of different address placements on the document.

A further advantage of this invention is that the most economically fold address combination may be chosen given the number of pages in the document.

A further advantage of this invention is that it is more energy efficient to electronically sort documents for postal discounts than to physically sort them for postal discounts.

DETAILED DESCRIPTION OF THE PREFERRED EMBODIMENT

Figure 1:
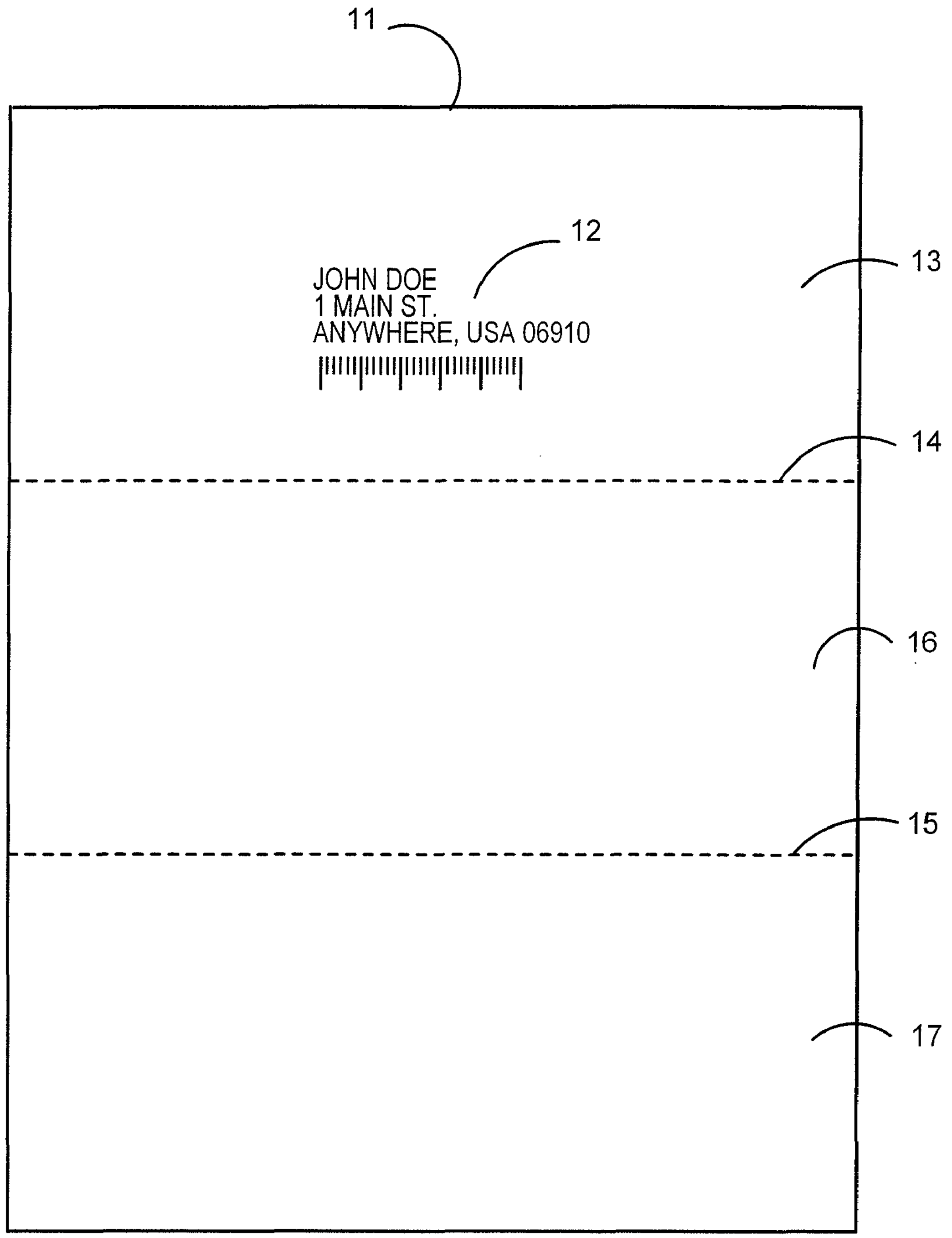
FIG. 1 is a drawing of a document having a recipient address in the top panel of the document.

Referring now to the drawings in detail, and more particularly to FIG. 1, the reference character 11 represents a document that has a recipient address field 12 in the top panel 13 of document 11. Document 11 has fold lines 14 and 15 which divides document 11 into top panel 13, middle panel 16 and bottom panel 17.

Figure 2:
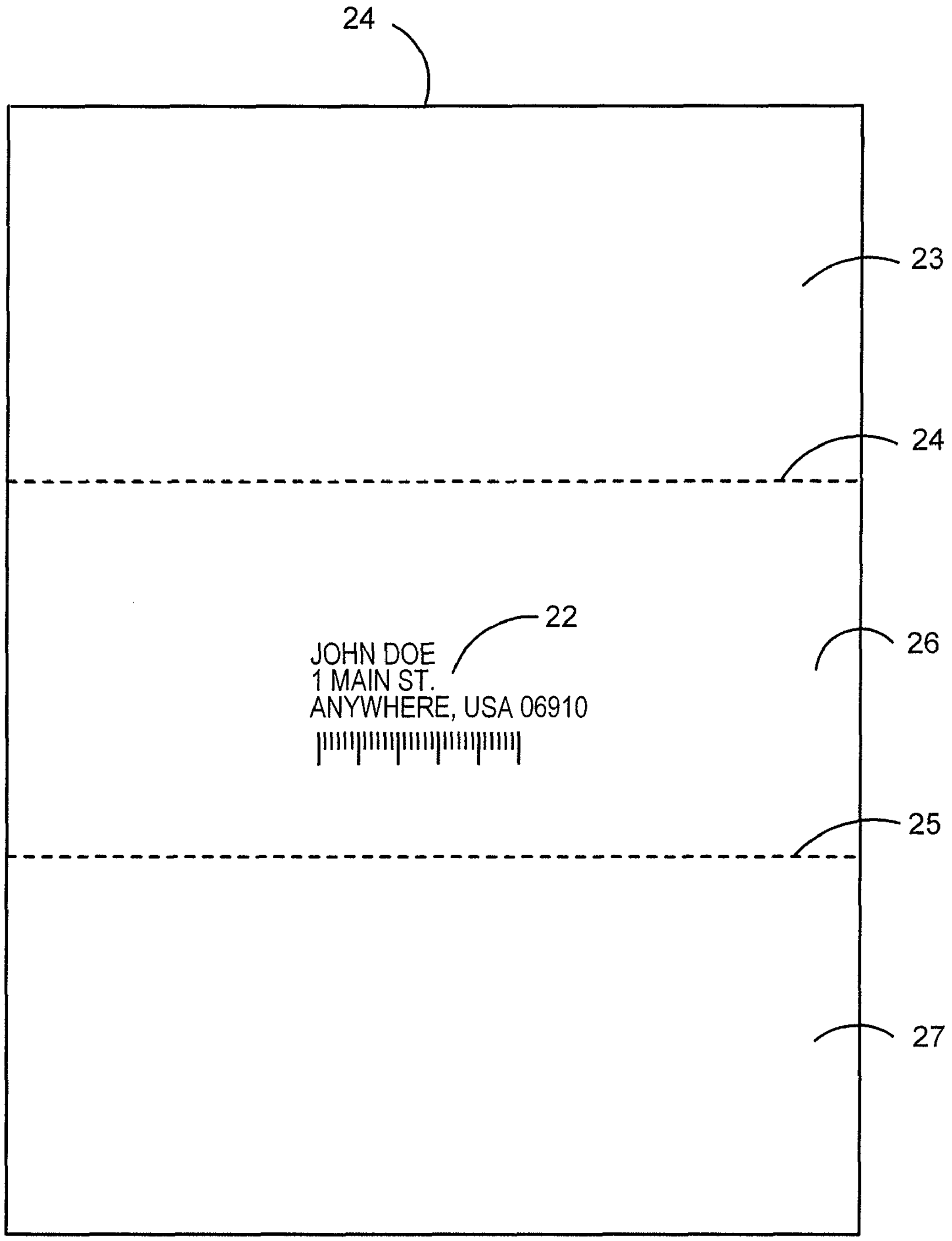
FIG. 2 is a drawing of a document having a recipient address in the middle panel of the document.

FIG. 2 is a drawing of a document 21 having a recipient address field 22 in the middle panel 26 of document 21. Document 21 has fold lines 24 and 25 which divides document 21 into top panel 23, middle panel 26 and bottom panel 27.

Figure 3:
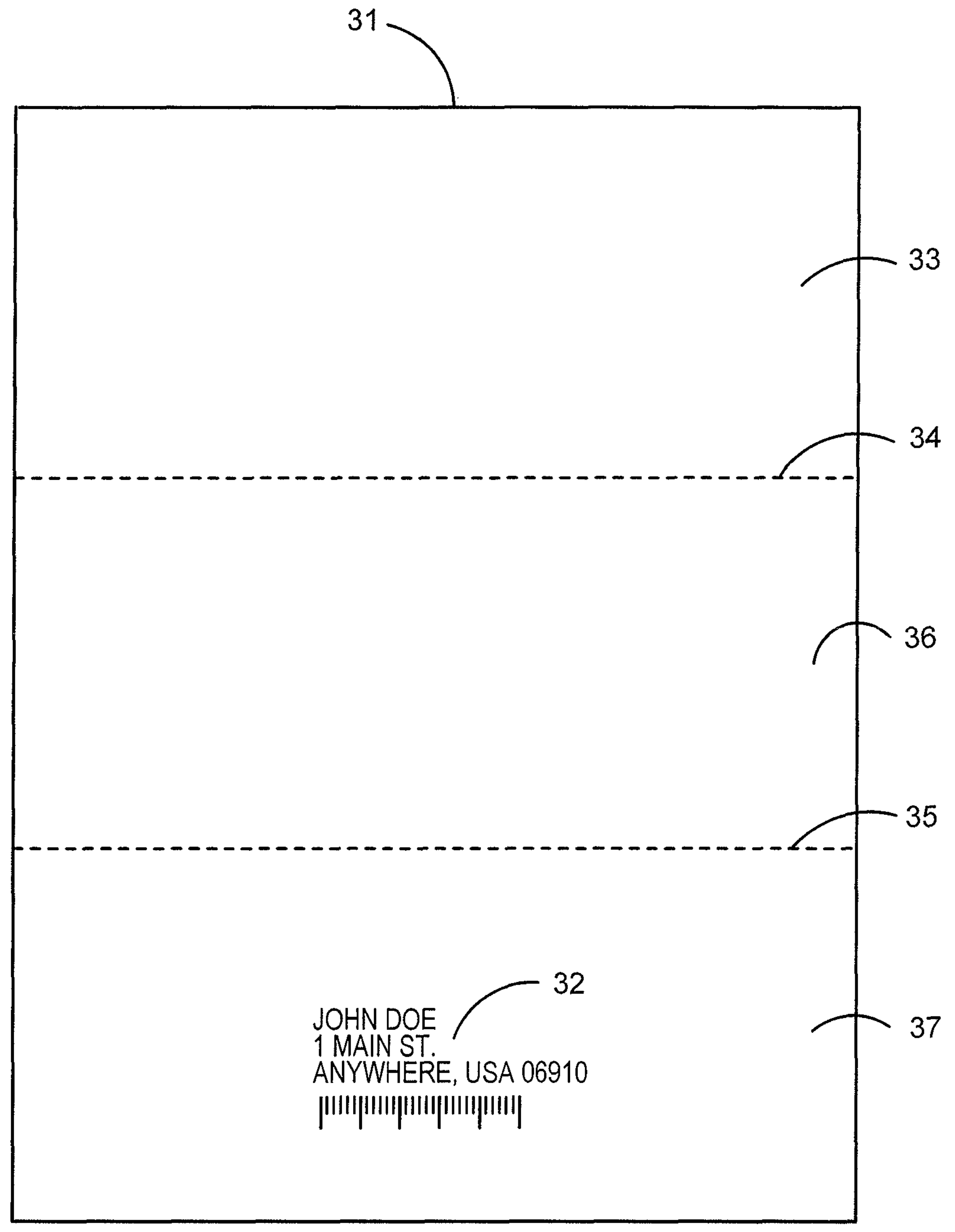
FIG. 3 is a drawing of a document having a recipient address in the bottom panel of the document.

FIG. 3 is a drawing of a document 31 having a recipient address field 32 in the bottom panel 37 of the document 31. Document 31 has fold lines 34 and 35 which divides document 21 into top panel 33, middle panel 36 and bottom panel 37.

Figure 4A:
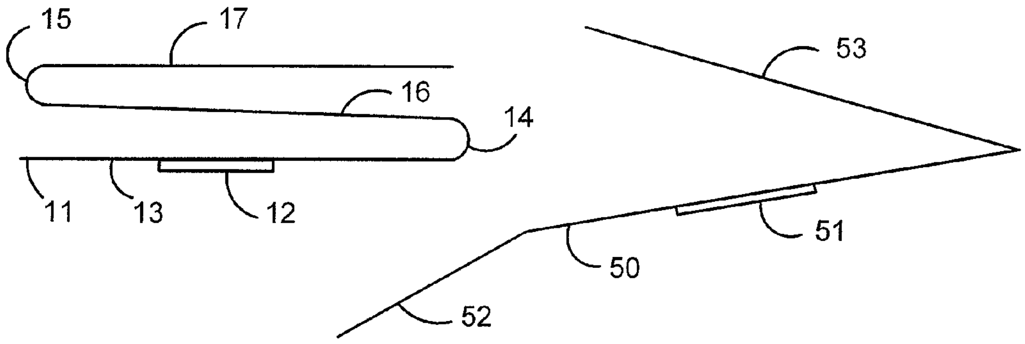
FIG. 4A is a drawing showing a top address taz fold document formed before it is inserted into an envelope.

FIG. 4A is a drawing showing a top address taz fold document 11 formed before document 11 is inserted into an envelope 50. Document 11 has a recipient address field 12 in the top panel 13 of document 11, fold lines 14 and 15 which divides document 11 into top panel 13, middle panel 16 and bottom panel 17. Envelope 50 has an open or windowed portion 51 a flap 52 and a body 53. When document 11 is inserted into envelope 50 recipient address field 12 will be visible through the windowed portion 51 of envelope 50.

Figure 4B:
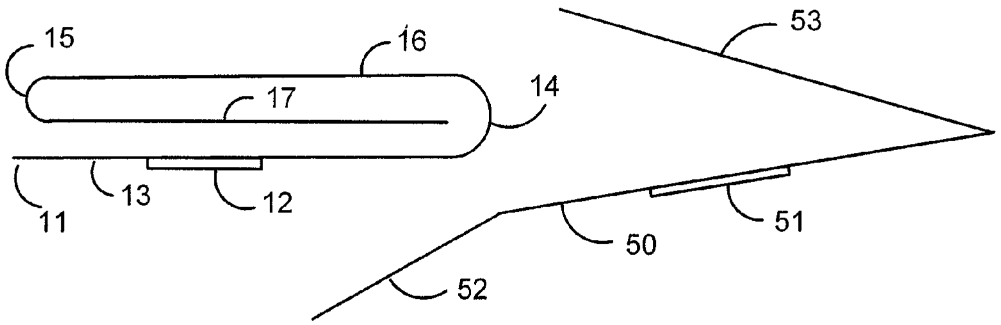
FIG. 4B is a drawing showing a top address tac fold document formed before it is inserted into an envelope.

FIG. 4B is a drawing showing a top address tac fold document 11 formed before document 11 is inserted into an envelope 50. Document 11 has a recipient address field 12 in the top panel 13 of document 11, fold lines 14 and 15 which divides document 11 into top panel 13, middle panel 16 and bottom panel 17. Envelope 50 has an open or windowed portion 51 a flap 52 and a body 53. When document 11 is inserted into envelope 50 recipient address field 12 will be visible through the windowed portion 51 of envelope 50.

Figure 5:
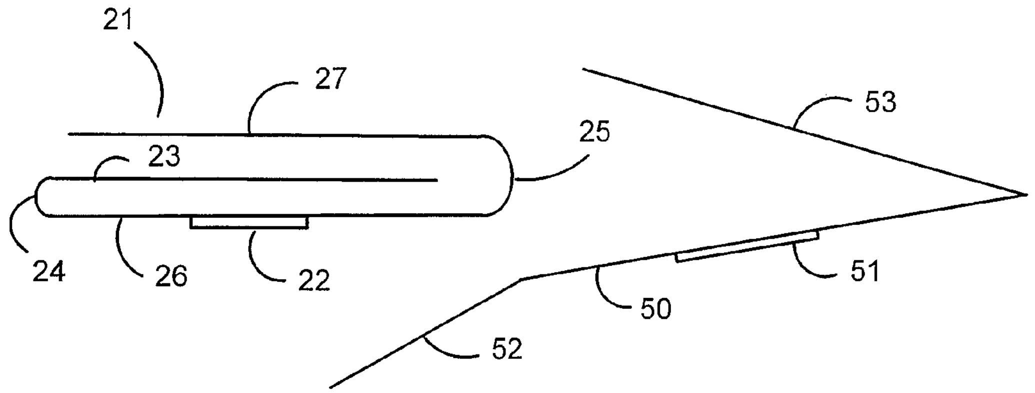
FIG. 5 is a drawing showing a middle address mac fold document formed before it is inserted into an envelope.

FIG. 5 is a drawing showing a middle address mac fold document 21 formed before it is inserted into an envelope 50. Document 21 has a recipient address field 22 in the middle panel 26 of document 21, fold lines 24 and 25 which divides document 21 into top panel 23, middle panel 26 and bottom panel 27. Envelope 50 has an open or windowed portion 51 a flap 52 and a body 53. When document 21 is inserted into envelope 50 recipient address field 22 will be visible through the windowed portion 51 of envelope 50.

Figure 6:
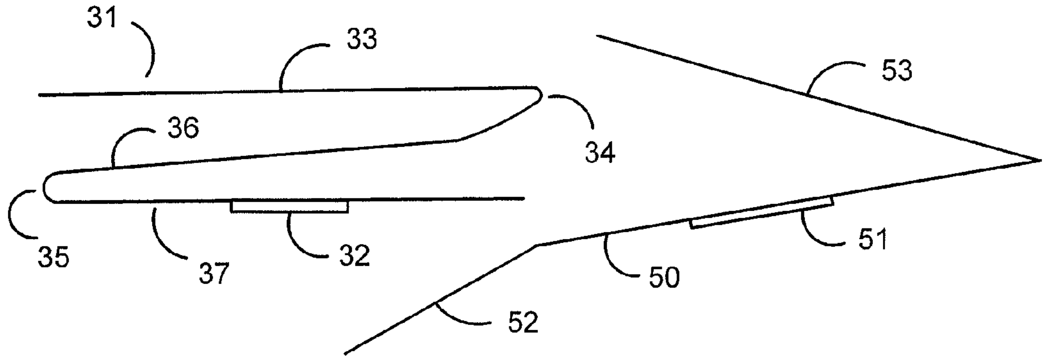
FIG. 6 is a drawing showing a bottom address baz fold document formed before it inserted into an envelope.

FIG. 6 is a drawing showing a bottom address baz fold document 31 formed before it inserted into an envelope 50. Document 31 has a recipient address field 32 in the bottom panel 37 of document 31, fold lines 34 and 35 which divides document 31 into top panel 33, middle panel 36 and bottom panel 37. Envelope 50 has an open or windowed portion 51 a flap 52 and a body 53. When document 31 is inserted into envelope 50 recipient address field 32 will be visible through the windowed portion 51 of envelope 50.

Figure 7A:
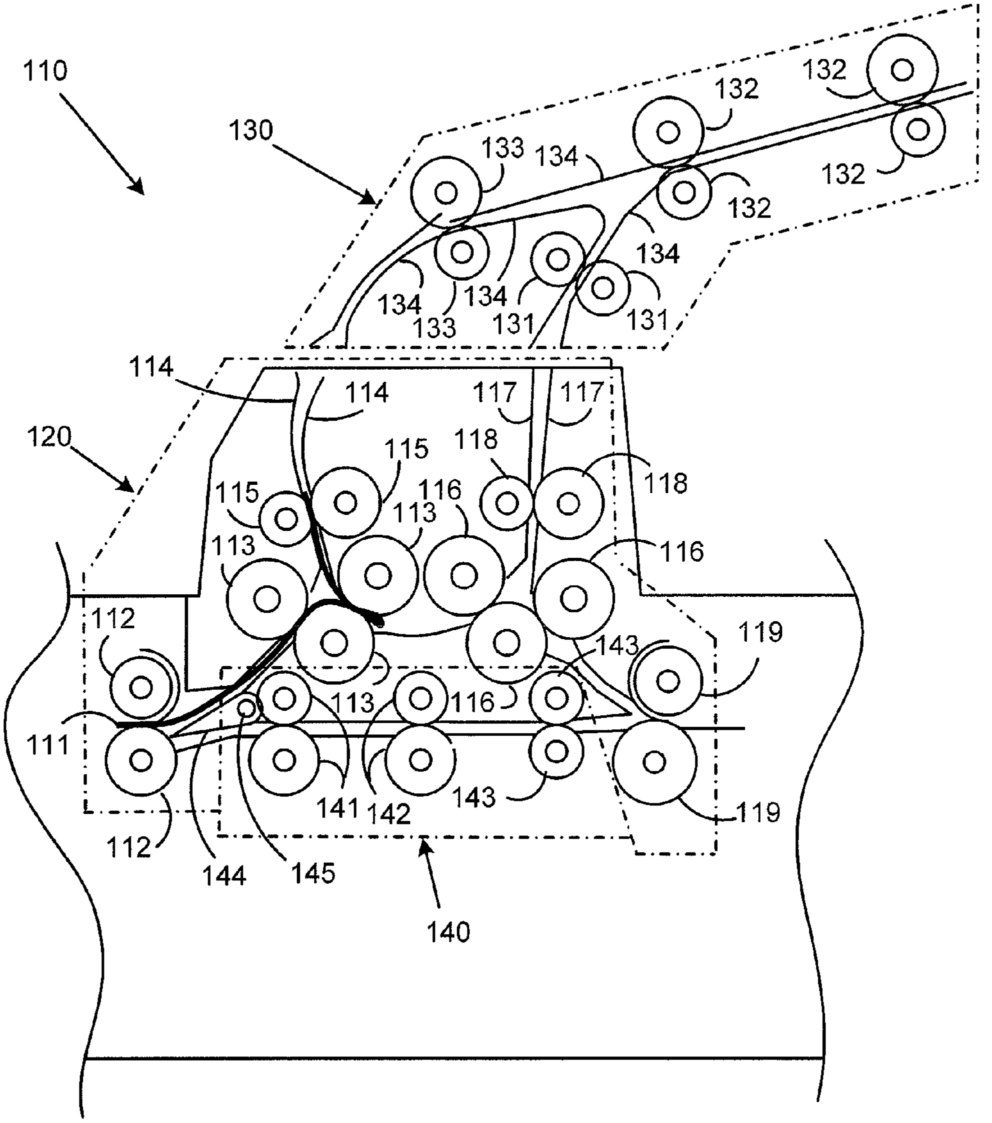
FIGS. 7A-7G are drawings showing a folder and fold sequence that enables documents to be folded into mac and baz folds.

In FIG. 7A the folder system 110 is shown with document 31 entering folder 120 through transport nip 112 and undergoing fold formation in the first fold roller cluster 113. Document 31 enters folder 120 with the printed face of document 31 facing down and the recipients address at the leading edge of document 31. The document 31 is advanced into the first buckle chute 114 by a distance equal to ⅓ of the length of document 31 prior to the formation of the first fold of document 31. The foregoing describes the process of forming the first fold of document 31.

Folder 120 includes roller cluster 113, buckle chute 114, smart nip 115, roller cluster 116, buckle chute 117, smart nip 118 and folder exit nip 119. Document inverter 130 comprises: inverter entry nip 131; inversion nips 132; exit nip 133 and paper guides 134. Folder bypass path 140 includes transport nips 141, 142 and 143.

Document 31 upon entering folder entrance nip 112 may be selectively transported to folder 120 (a primary folder path) or folder bypass path 140 through the articulation of the entrance gate 144. It should be obvious to one skilled in the art that entrance gate 144 may be pivoted axis 145, such that document 31 would be transported to the folder bypass path 140 which would prevent the formation of folds in document 31. Thus, folding system 110 provides the option to not fold document 31.

Figure 7B:
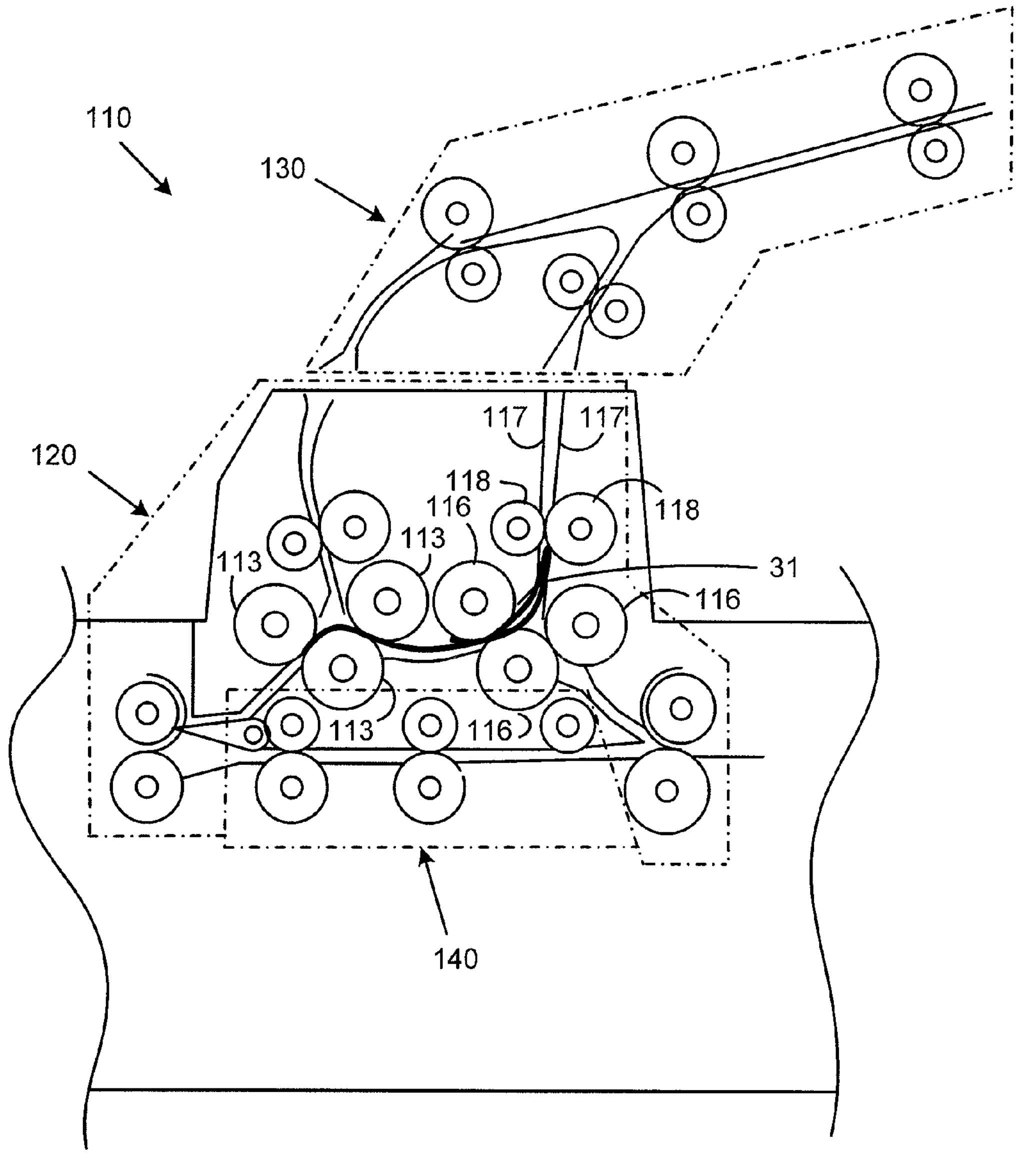
Figure 7C:
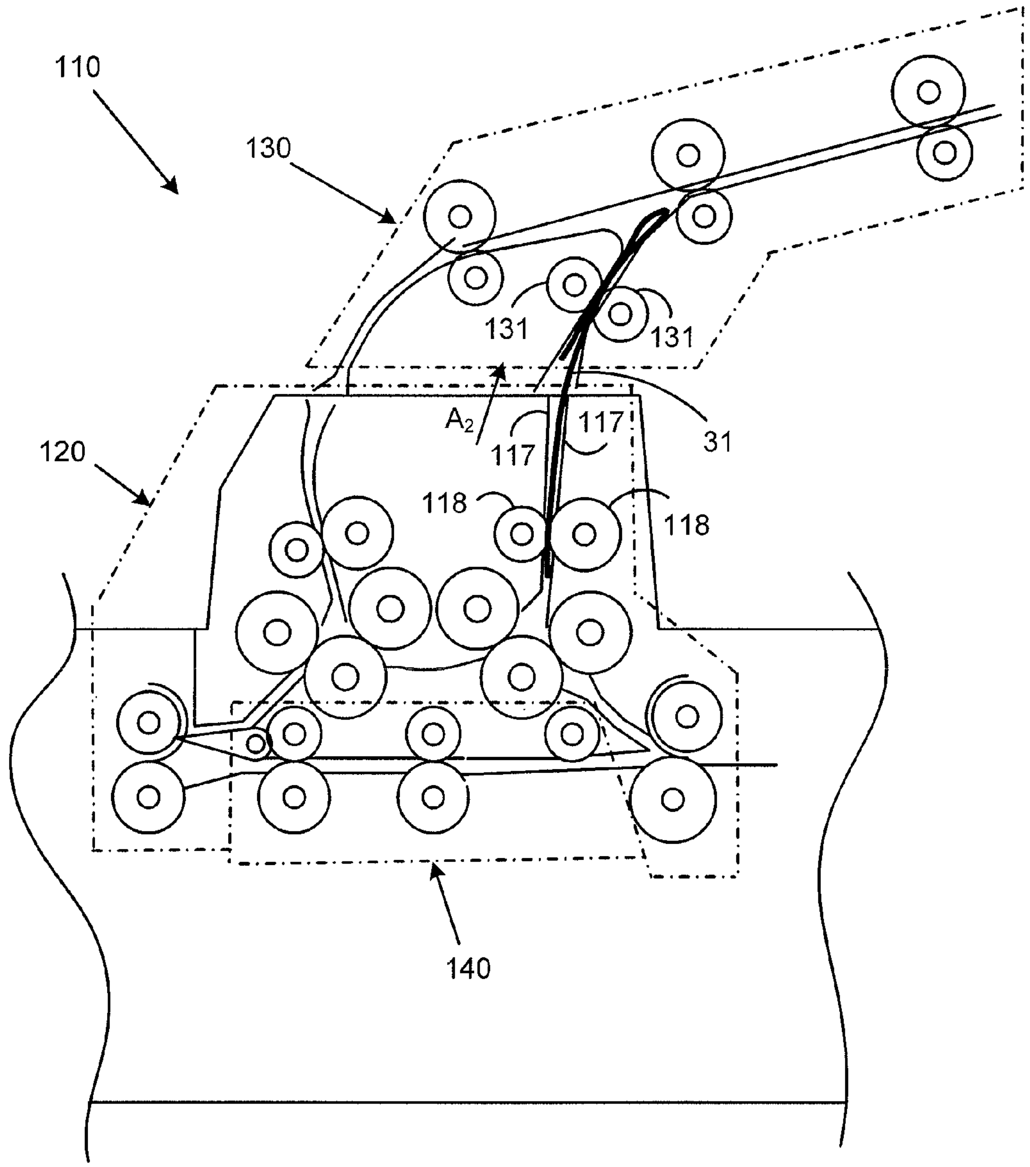
Figure 7D:
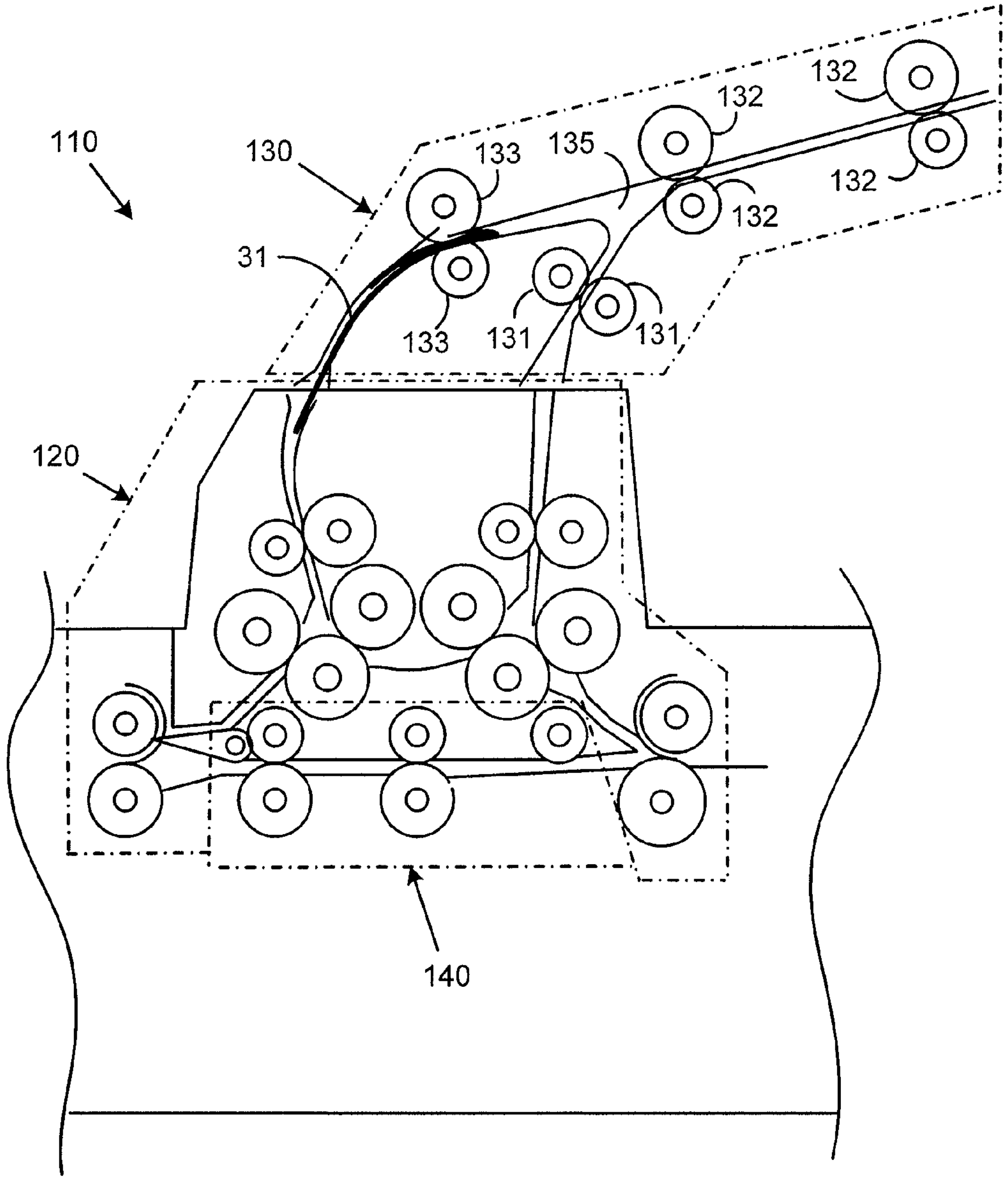
Figure 7E:
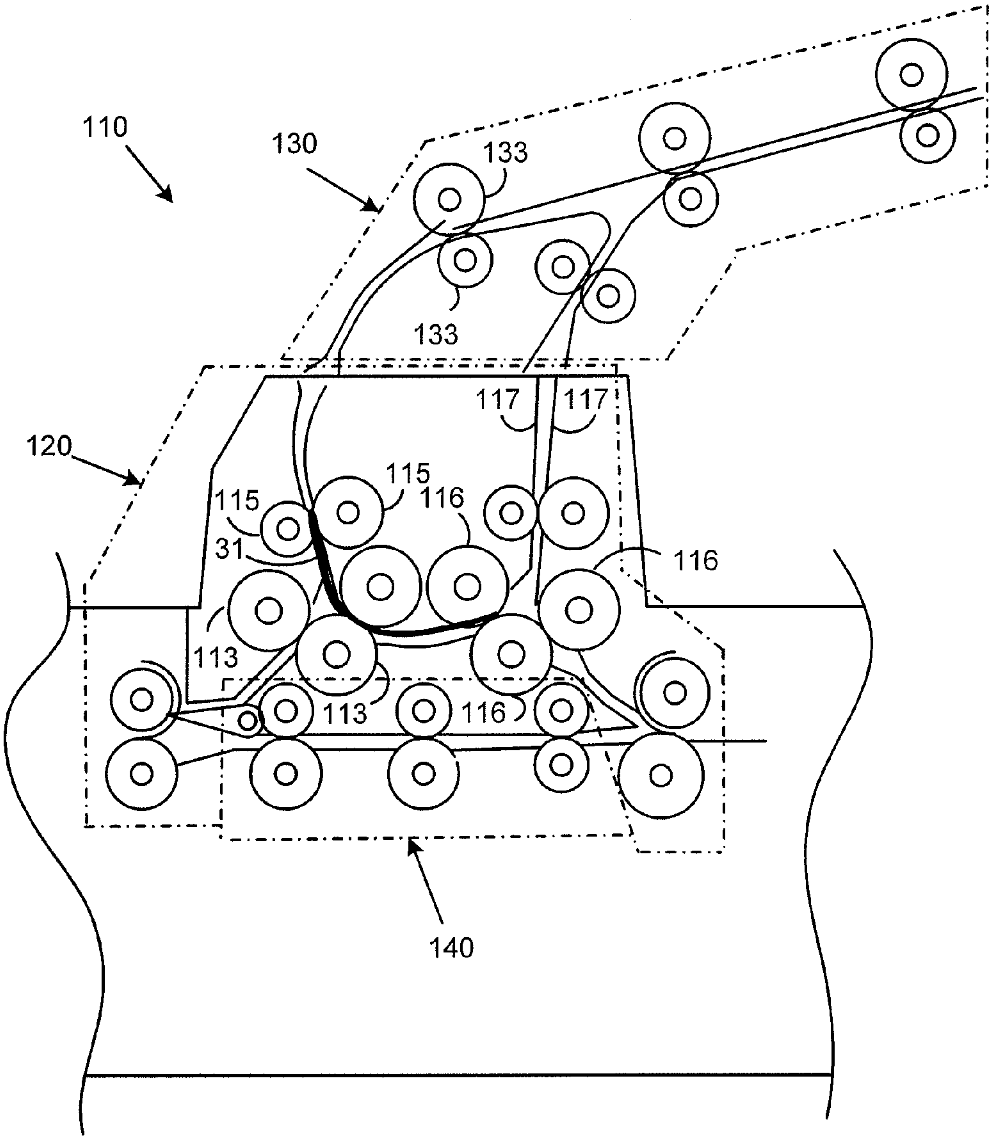
Figure 7F:
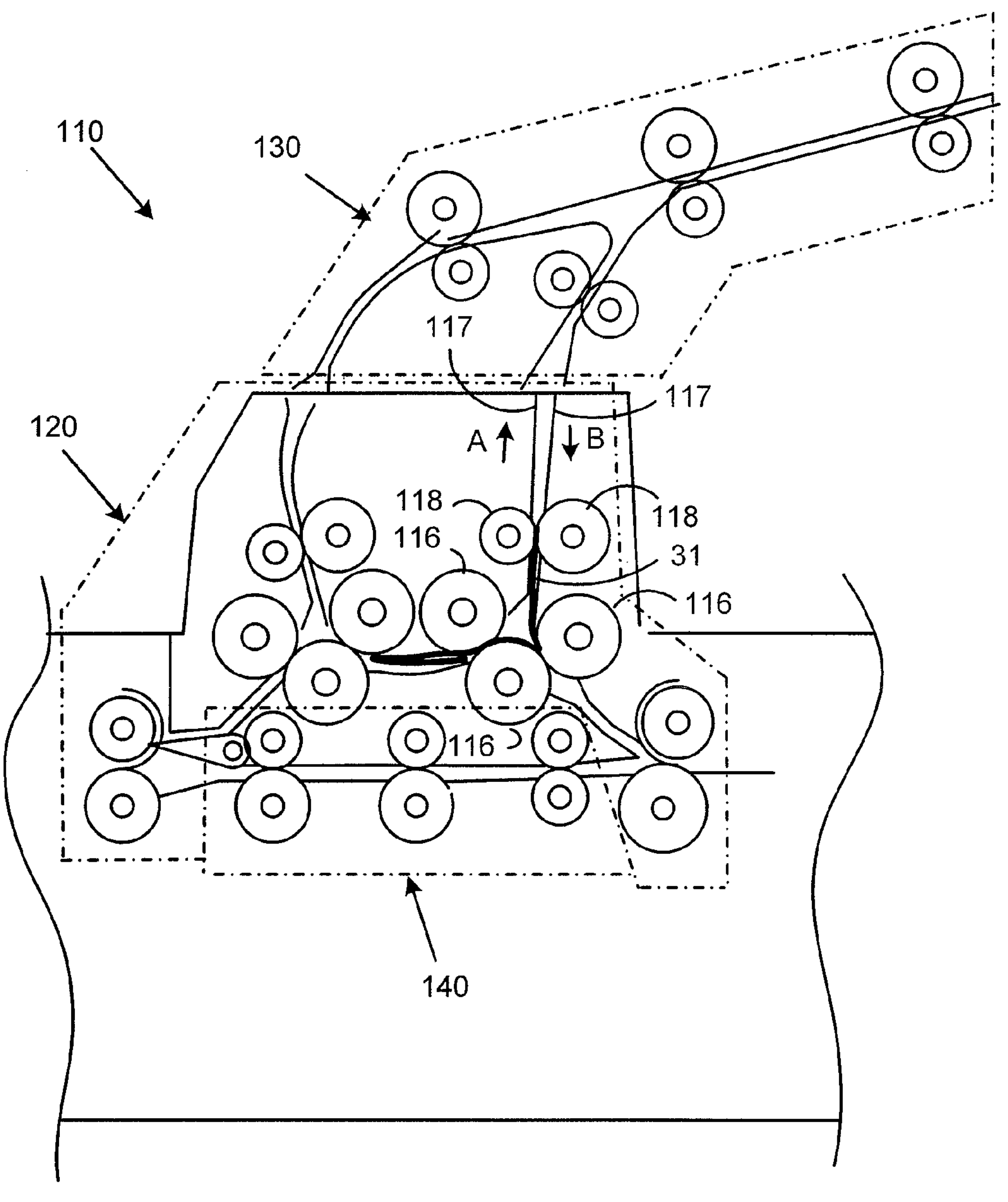
Figure 7G:
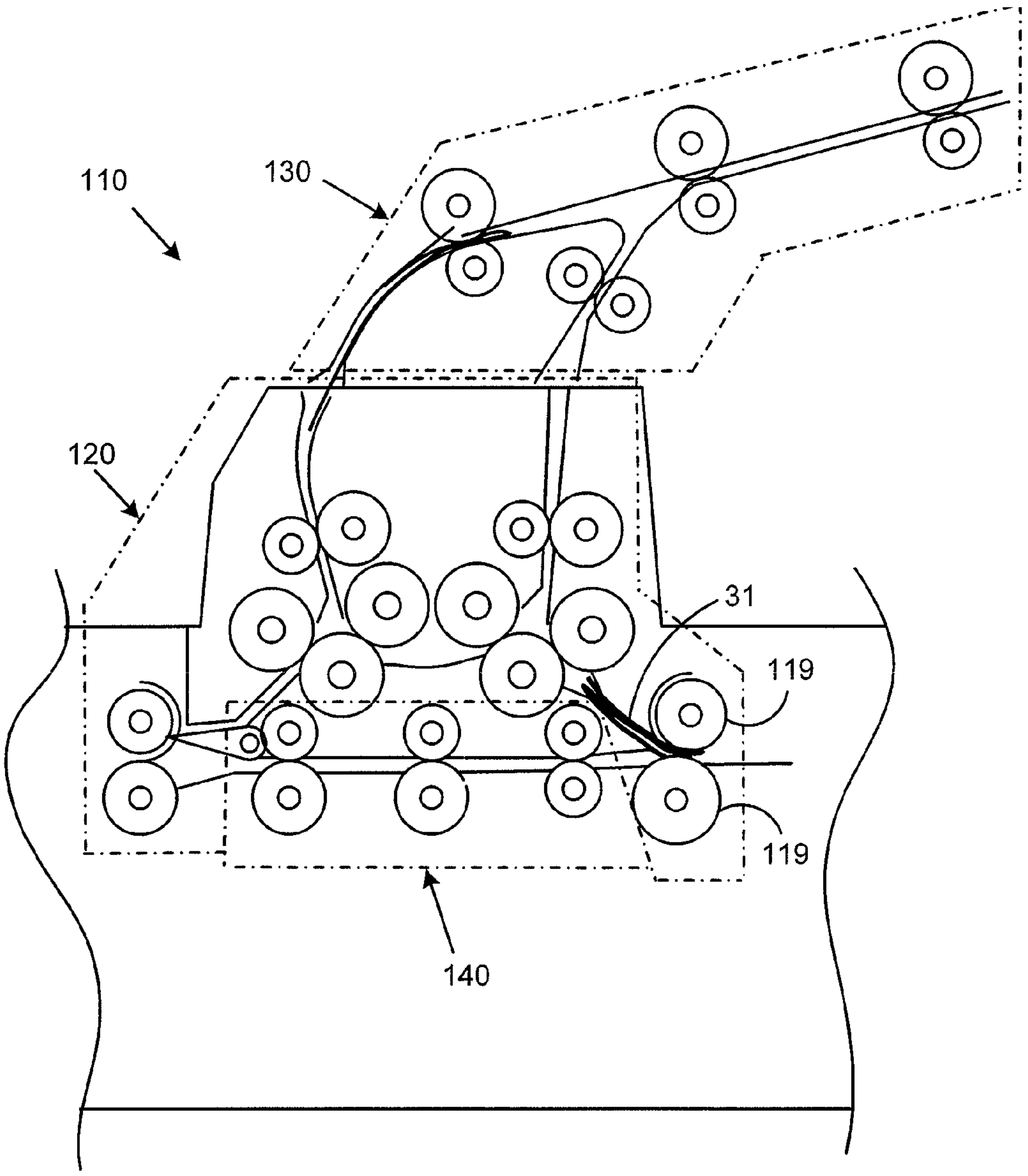

FIGS. 7B-7G illustrates the progression of the document through the fold system paper path with FIG. 7G showing a fully formed bottom address baz-fold exiting the folder.

Also shown in FIGS. 7B-7G is a paper path that by-passes the fold system. The foregoing paper path system can not readily be realized in a system having opposing buckle chutes.

FIG. 7B illustrates the second step in the formation of a bottom address baz fold. Document 31 has advanced from first fold roller cluster 113 to fold cluster 116 and the leading edge of document 31 has entered buckle chute 117 and is approaching smart nip 118.

FIG. 7C illustrates the third step in the formation of a bottom address baz fold. Document 31 has been driven by smart nip 118 in a direction "A" through buckle chute 117 and has entered inverter entry nip 131.

FIG. 7D illustrates the fourth step in the formation of a bottom address baz fold. Document 31 has been transported by entry nip 131 to inversion nips 132 which upon receiving document 31 and driving the trailing edge of document 31 past the inversion point 135 have then reversed the direction of travel of document 31 and have transported document 31 to inverter exit nip 133. The path from nip 131 to nips 132 and 133 is a second inversion path. Note that the current leading of document 31 was the trailing edge of document 11 as shown in FIGS. 7A-7C.

FIG. 7E illustrates the fifth step in the formation of a bottom address baz fold. Document 31 has been driven by inverter exit nip 133 to smart nip 115 which has received document 31 and transported document 111 to first fold roller cluster 113. Document 31 is shown spanning smart nip 115, first fold roller cluster 113, and fold cluster 116 with the unfolded edge of document 31 advancing towards buckle chute 117.

FIG. 7F illustrates the sixth step in the formation of a bottom address baz fold. Document 31 is shown during the process of the second fold formation in fold cluster 116. Smart nip 118 has received the unfolded edge of document 31 and transported document 31 in direction "A" until document 31 has entered buckle chute 117 by the length desired for the second fold. Smart nip 118 has then reversed the direction of document 31, driving document 31 in direction "B" towards fold cluster 116 which forms the second fold of document 31.

FIG. 7G illustrates the fully formed bottom address baz fold of document 31 exiting the folder 120 via folder exit nip 119.

The advancing of the document into the first buckle chute by a distance equal to ⅔ of the length of the document and executing the paper path processes described in FIGS. 7B-7G will result in the formation of a middle address mac fold that accommodates the address location on document 21 as shown in FIGS. 2 and 5.

Figure 8A:
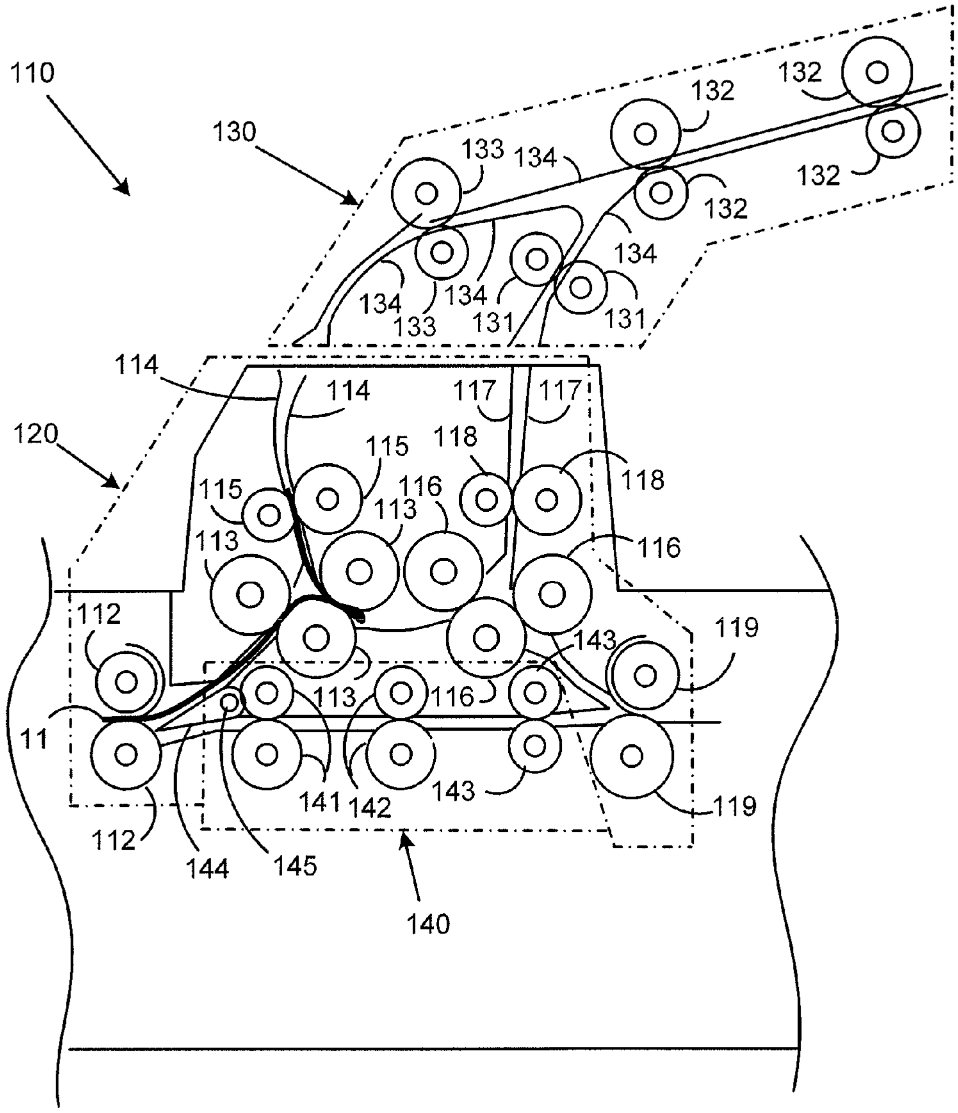
FIGS. 8A-8D are drawings showing a folder and fold sequence that enables documents to be folded into taz and tac folds.

In FIG. 8A the folder system 110 is shown with document 11 entering folder 120 through transport nip 112 and undergoing fold formation in the first fold roller cluster 113. Document 11 enters folder 120 with the printed face of document 11 facing down and the recipients address at the trailing edge of document 11. The document 11 is advanced into the first buckle chute 114 by a distance equal to ⅓ of the length of document 11 prior to the formation of the first fold of document 11. The foregoing describes the process of forming the first fold of document 11.

Folder 120 includes roller cluster 113, buckle chute 114, smart nip 115, roller cluster 116, buckle chute 117, smart nip 118 and folder exit nip 119. Document inverter 130 comprises: inverter entry nip 131; inversion nips 132; exit nip 133 and paper guides 134. Folder bypass path 140 includes transport nips 141, 142 and 143.

Document 31 upon entering folder entrance nip 112 may be selectively transported to folder 120 (a primary folder path) or folder bypass path 140 through the articulation of the entrance gate 144. It should be obvious to one skilled in the art that entrance gate 144 may be pivoted axis 145, such that document 11 would be transported to the folder bypass path 140 which would prevent the formation of folds in document 11. Thus, folding system 110 provides the option to not fold document 11.

Figure 8B:
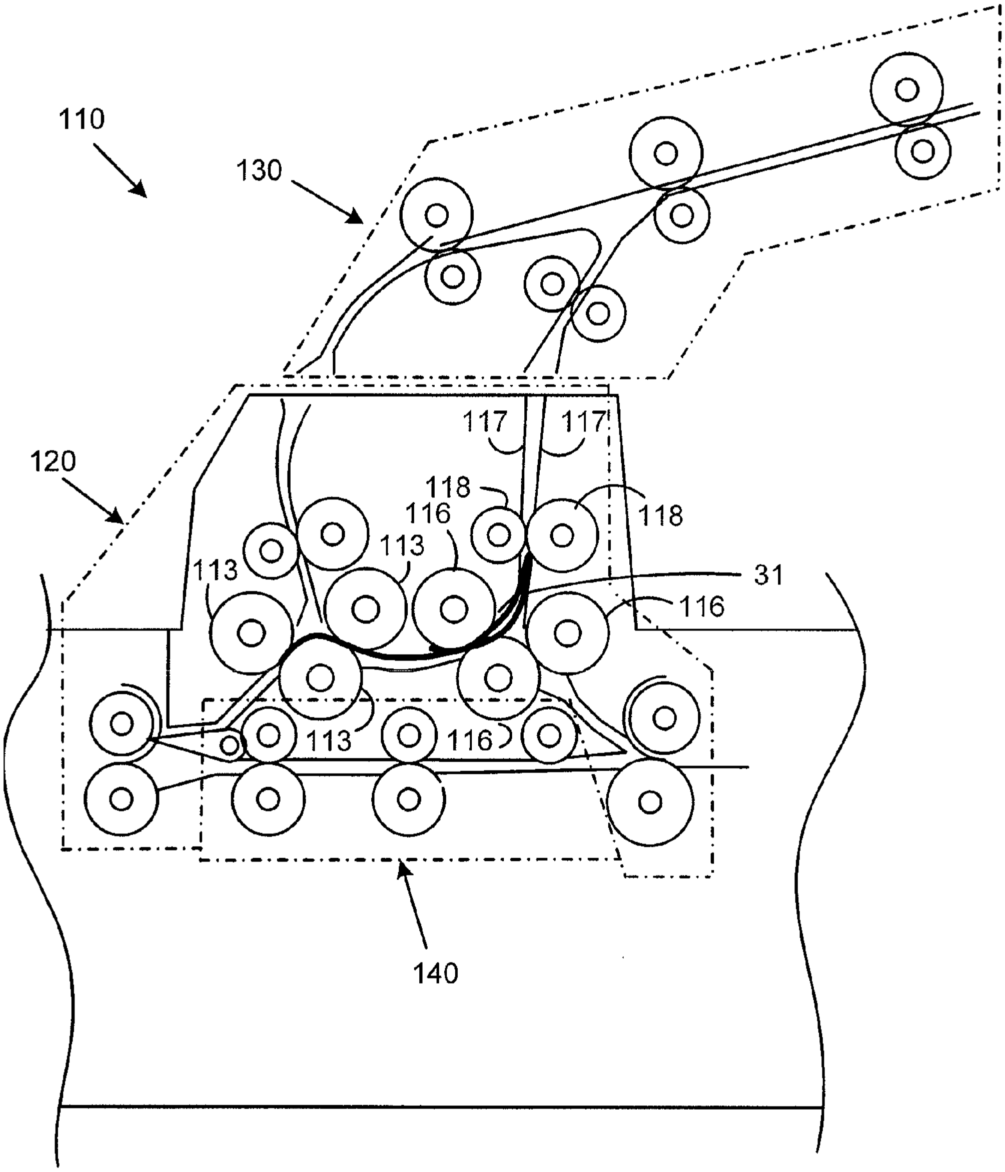
Figure 8C:
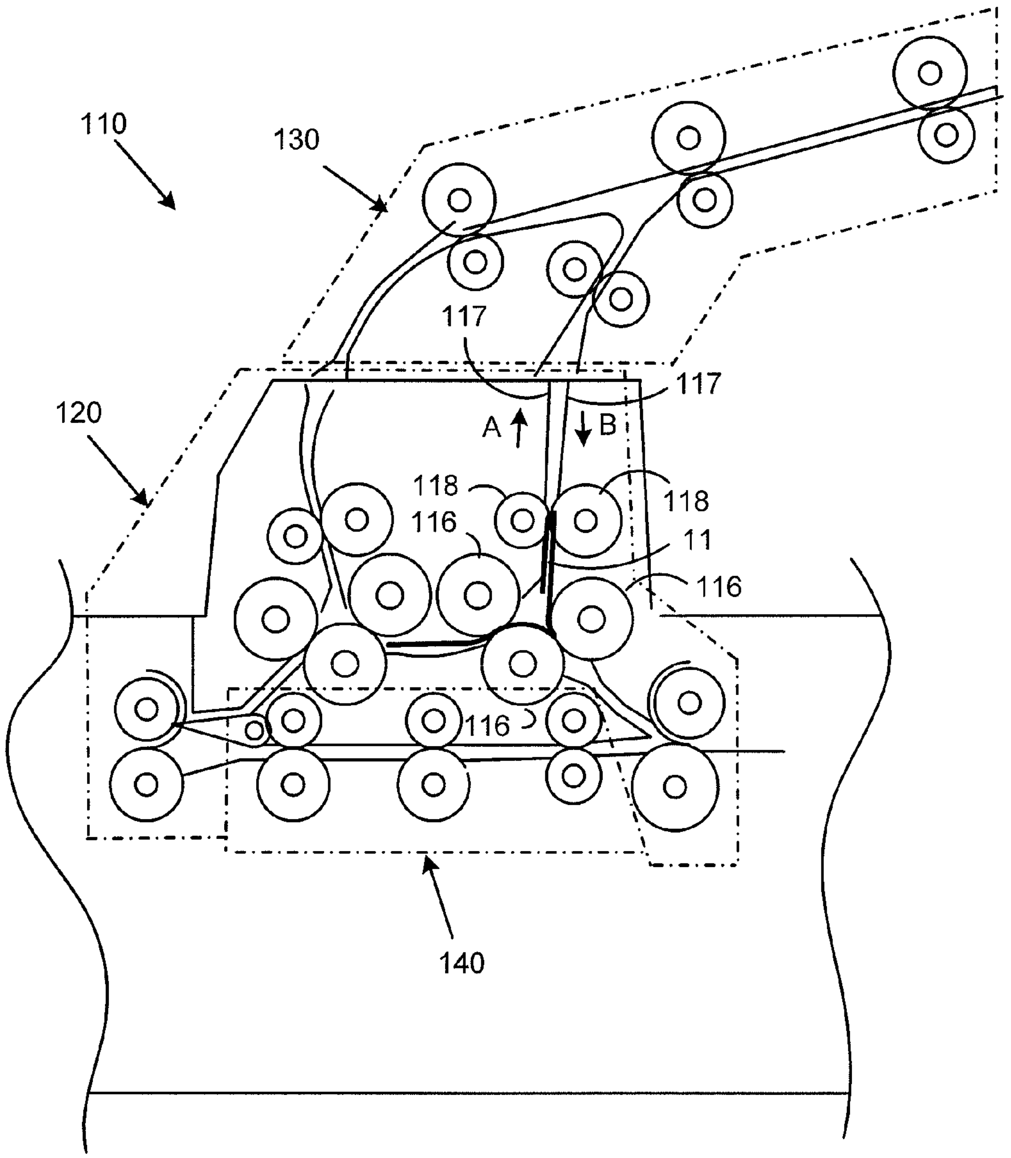
Figure 8D:
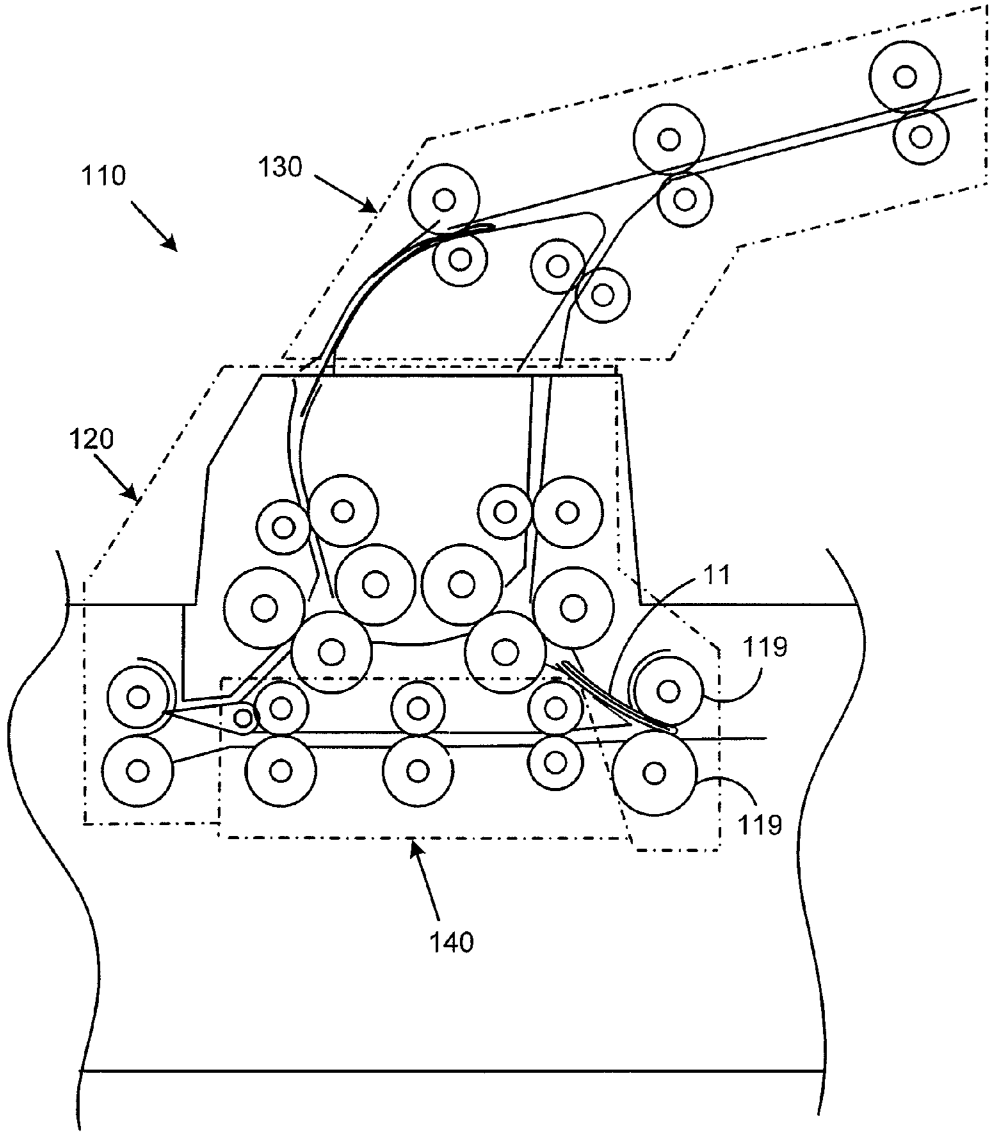

FIGS. 8B-8D illustrates the progression of the document through the fold system paper path with FIG. 8D showing a fully formed top address tac-fold exiting the folder.

Also shown in FIGS. 8B-8D is a paper path that by-passes the fold system. The foregoing paper path system can not readily be realized in a system having opposing buckle chutes.

FIG. 8B illustrates the second step in the formation of a top address tac fold. Document 11 has advanced from first fold roller cluster 113 to fold cluster 116 and the leading edge of document 11 has entered buckle chute 117 and is approaching smart nip 118.

FIG. 8C illustrates the fourth step in the formation of a top address tac fold. Document 11 is shown during the process of the second fold formation in fold cluster 116. Smart nip 118 has received the folded edge of document 11 and transported document 11 in direction "A" until document 11 has entered buckle chute 117 by the length desired for the second fold. Smart nip 118 has then reversed the direction of document 11, driving document 11 in direction "B" towards fold cluster 116 which forms the second fold of document 11.

FIG. 7D illustrates the fully formed top address tac fold of document 11 exiting the folder 120 via folder exit nip 119.

By introducing document 11 face up with the address panel leading and advancing of the document into the first buckle chute by a distance equal to ⅔ of the length of the document and executing the paper path processes described in FIGS. 8B-8D will result in the formation of a top address tac fold.

Figure 9:
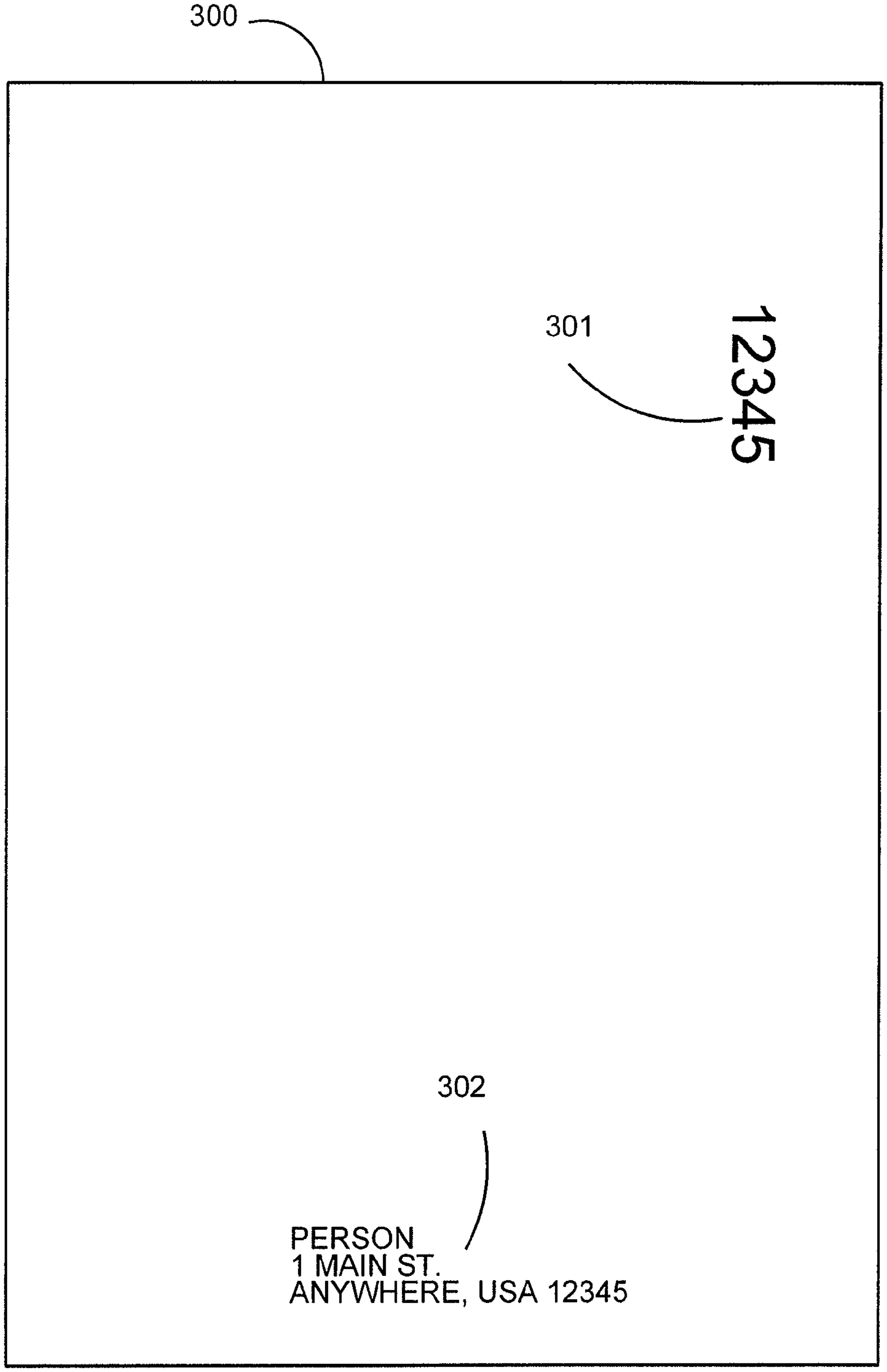
FIG. 9 is a drawing showing a code on a document that enables the folder control system to fold the document to the coded fold type.
Figure 10:
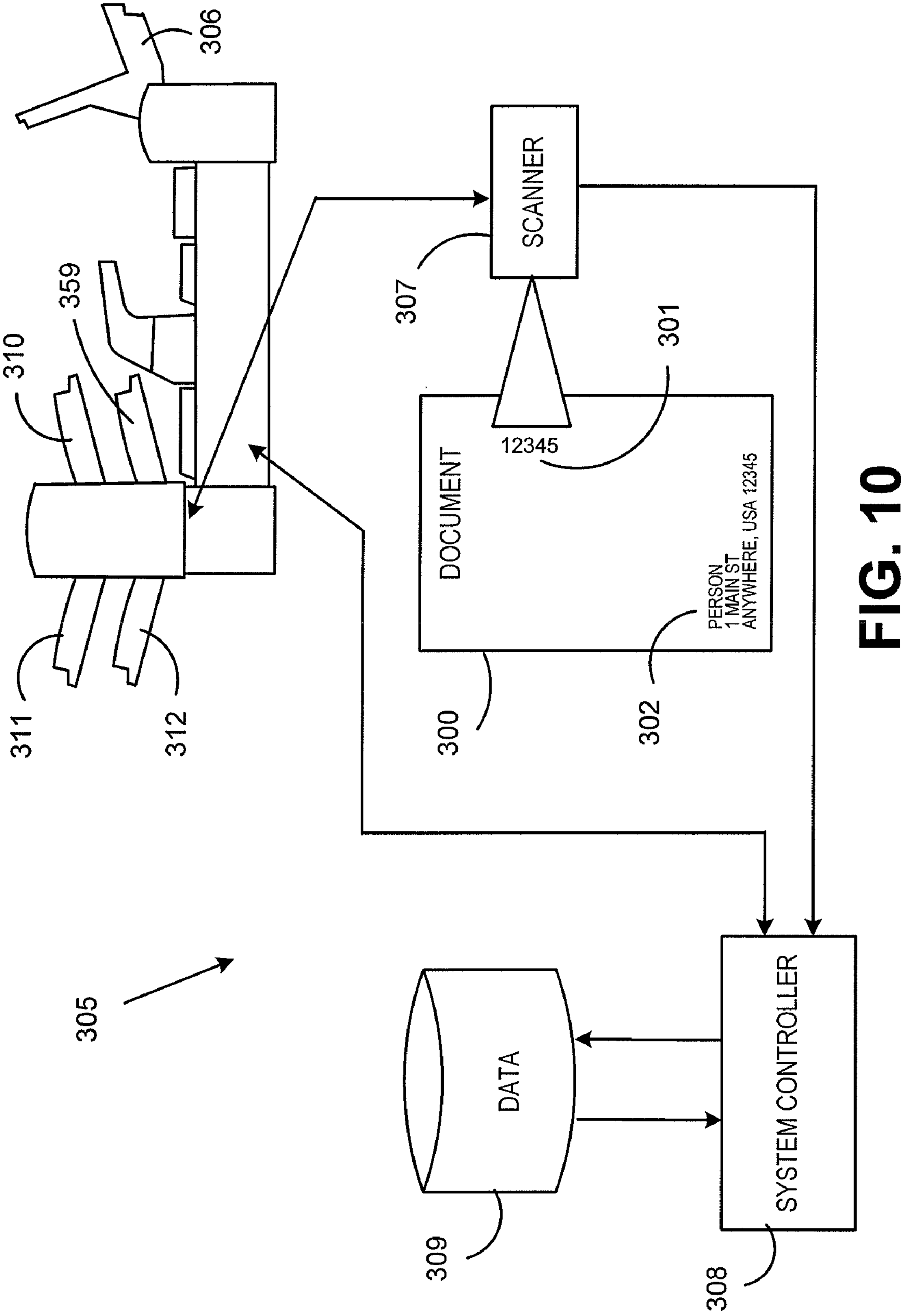
FIG. 10 is a drawing showing the folder control system of FIG. 9.

FIG. 9 is a drawing showing a code 301 on a document 300 that enables the folder control system described in the description of FIG. 10 to fold the document to the coded fold type. Code 301 may be in the form of alphanumeric characters, glyphs, and/or symbols that may be printed on document 300 with a visible ink and/or an invisible luminescent ink. Code 301 may also be contained in a radio frequency identification tag.

Code 301 would indicate the type of fold that is going to be made. For instance the first character of an alphanumeric code may represent enumerated fold types, i.e., 1 equals C-fold, 2 equals Z-fold and 3 equals half fold, etc. The second and subsequent characters of code 301 represent other machine control functions and/or customer account numbers.

The recipient name and address 302 is shown near the bottom of document 300. Thus, the appropriate fold for document 300 is a bottom address Z-fold.

FIG. 10 is a drawing showing the folder control system of FIG. 9. Folder control system 305 includes folder inserter 306, document scanner 307, system controller 308 and data base 309. Scanner 307 is typically located in the paper path of inserter 306 allowing documents 300 to be to be scanned as they are fed from feeder trays 359, 310, 311 and 312. Document 300 passes through the field of view of scanner 307 and code 301 is recognized on the document 300.

Scanner 307 may be an optical character recognition scanner, bar code scanner, radio frequency identification reader, ultraviolet detector, infrared detector, etc. As code 301 is read, scanner 307 passes the decoded information to system controller 308. Controller 308 uses a set of rules to process code 301 and set the fold type for the document in folder inserter 306 based on the results of the rule processing. The rules may include instructions on selecting the fold type from an enumerated list of fold types based on a digit, character or sequence of digits and/or characters in the scanned code. Controller 308 may also use a digit, character or sequence of digits and/or characters as a key identification to retrieve the fold type from data base 309. There are numerous other methods for processing code 300 data to select a fold type that are obvious to one skilled in the art.

The above specification describes a new and improved method for mailing and sorting mail pieces to increase postal discounts. It is realized that the above description may indicate to those skilled in the art additional ways in which the principles of this invention may be used without departing from the spirit. Therefore, it is intended that this invention be limited only by the scope of the appended claims.

What is claimed is:

1. A method for preparing a mailing comprising the steps of:

creating a first code for a first document, the first code being indicative of the location of an address in the first document;

creating a second code for a second document, the second code being indicative of the location of an address in the second document;

electronically sorting the first and second documents within a folder inserter based respectively upon the address in the first document and the address in the second document;

using the folder inserter for capturing the first and second codes;

printing the first and second documents;

determining a specific fold type for each of the first and second documents based on the respective first and second codes;

folding the first and second documents in the folder inserter in accordance with its respective determined fold type; and inserting the first and second documents into a plurality of mail pieces in the order in which the documents were sorted.

2. A method as set forth in claim 1 wherein the specific fold type for each of the first and second documents is determined based on information about a type of windowed envelope together with the respective first and second codes.

* * * * *